United States Patent [19]

Cords

[11] 3,910,187

[45] Oct. 7, 1975

[54] DRY PLANOGRAPHIC PRINTING PLATE

[75] Inventor: Donald Philip Cords, Newark, Del.

[73] Assignee: E. I. Du Pont de Nemours and Company, Wilmington, Del.

[22] Filed: Aug. 22, 1973

[21] Appl. No.: 390,372

Related U.S. Application Data

[63] Continuation-in-part of Ser. No. 176,094, Aug. 30, 1971, abandoned.

[52] U.S. Cl. .................... 101/450; 96/33; 101/453; 101/456; 101/457; 101/460; 101/462; 101/465

[51] Int. Cl.$^2$ .......................................... B41M 1/00; B41N/1/00; G03F/7/02

[58] Field of Search .........96/33; 101/450, 453, 454, 101/456–459, 460, 462, 463, 476, 101/466, 467

[56] References Cited

UNITED STATES PATENTS

| | | | |
|---|---|---|---|
| 3,368,483 | 2/1968 | Storms | 96/33 |
| 3,511,178 | 5/1970 | Curtin | 96/33 |
| 3,677,178 | 7/1972 | Gipe | 96/33 |

*Primary Examiner*—David Klein
*Attorney, Agent, or Firm*—James A. Costello

[57] ABSTRACT

Disclosed herein is a dry planographic printing plate and processes for making and using the plate. The plate is characterized, inter alia, by having a fluorine-containing compound as the nonprinting portion of the surface. The nonprinting portion of the surface is characterized by having a critical surface tension of up to about 15.4 dynes/cm. as determined by advancing contact angles and up to about 16.1 dynes/cm. as determined by receding contact angles.

28 Claims, 5 Drawing Figures

INVENTOR
DONALD PHILIP CORDS

BY

ATTORNEY

DRY PLANOGRAPHIC PRINTING PLATE

CROSS-REFERENCE TO RELATED APPLICATION

This is a continuation-in-part application of copending application Ser. No. 176,094, filed on Aug. 30,1971, and now abandoned.

BACKGROUND OF THE INVENTION

1. Field of the Invention

This invention relates broadly to a dry planographic printing plate having the nonprinting portion of its surface comprised of one or more selected fluorine-containing compounds, all of said fluorine-containing compounds being characterized by having critical surface tensions within certain ranges. Processes for making and using the novel plates are also described herein.

2. Description of the Prior Art

Planographic plates having printing surfaces wettable by printing ink and nonprinting surfaces which can be made ink-repellent by temporary liquid films of fountain solution are well-known in the art. Plates employing this principle are known as lithographic printing plates.

Most fountain solutions used with such plates are aqueous although use of hydrocarbon fountain solutions is also known. A fountain solution is applied to a lithographic plate just before the plate is inked to provide a temporary ink-repellent liquid film on nonprinting surfaces of the plate. Inking the plate then provides a pattern of ink which is ultimately transferred to a receiving substrate.

The use of a fountain solution poses many problems based primarily on the difficulty of fine control of fountain solution application in order to avoid production of weak prints or smudged prints. U.S. Pat. No. 3,511,178, and U.S. Pat. No. 3,677,178, disclose lithographic plates having polysiloxane rubber as ink-repellent background surfaces. The rubber surfaces of U.S. Pat. No. 3,511,178 are characterized by an adhesive tape release value. This is critical, for polysiloxane resins are shown to have high release values and to be ink-accepting. U.S. Pat. No. 3,368,483, discloses a lithographic plate using smooth polytetrafluoroethylene as the ink-rejecting surface.

SUMMARY OF THE INVENTION

This invention concerns a dry planographic printing plate comprising a support with a surface having A. a printing portion receptive to printing ink, and B. a nonprinting portion which repels printing ink, the nonprinting portion selected from the group consisting of i. a fluorine-containing compound having a fluorinated radical at one end and a polar radical at the other end, and ii. a fluorine-containing compound that is a polymer of a compound having a fluorinated radical linked to a radical having a polymerizable carbon-to-carbon linkage, the nonprinting portion of the plate being characterized by a critical surface tension at 25°C. of up to about 15.4 dynes/cm. as determined by advancing contact angles and up to about 16.1 dynes/cm. as determined by receding contact angles, the advancing and receding contact angles determined, respectively, by observing an expanding and contracting drop of an n-alkane test liquid on the nonprinting portion of the plate.

This invention also concerns making the described planographic printing plate as follows:

I. A process comprising

A. treating the surface of a photoexposed but undeveloped lithographic plate having ink-receptive areas of photoconverted photosensitive composition and areas of unconverted photosensitive composition, with a liquid which i. is a solvent for and capable of removing the unconverted photosensitive composition, ii. is nonswelling and a nonsolvent for the ink-receptive photoconverted photosensitive composition, and iii. has dissolved therein an inkrejecting fluorine-containing compound as described herein, and B. removing the liquid of (A) and with it the unconverted photosensitive composition from the surface leaving behind on the areas where the unconverted composition had been, a sufficient residue of the fluorine-containing compound to impart ink-repellency to those areas when dry.

II. A process comprising

A. coating the surface of a lithographic plate having inherently ink-receptive portions and portions which are ink-receptive when dry but ink-rejecting when wet by a fountain fluid, with a layer of an ink-repellent fluorine-containing compound as described herein, B. treating the coated surface with a liquid which is i. a solvent for and capable of removing the inherently ink-receptive portion of the lithographic plate surface beneath the coating, and ii. a nonsolvent for the ink-repellent fluorinated composition, and C. removing the liquid of (B) from the surface and with it the inherently ink-receptive portions of the lithographic plate beneath the coating and the fluorine-containing compound coating over the inherently ink-receptive portions leaving behind uncoated portions of lithographic plate which are ink-receptive.

III. A process comprising

A. coating an ink-receptive surface with a coating of a photopolymerizable fluorine-containing compound as described herein, B. photopolymerizing a portion of said coating thereby converting it into a polymer such as is described herein, and C. removing the unpolymerized fluorine-containing composition.

Such removal of the unpolymerized fluorine-containing composition can be by volatilization or by any other means that will occur to those skilled in the art.

This invention also concerns a process for printing with the planographic plate described herein comprising inking the plate while it bears no fountain solution, thereby producing a pattern of ink on the printing portion thereof, and transferring that pattern to a surface to be printed. The ink pattern transfer can be direct, as in contact printing, or indirect, as by pattern transfer via an offset blanket in offset printing.

All of the fluorine-containing compounds described herein as being useful as the nonprinting portion(s) of the surface of the disclosed printing plates are known, as are various methods for their preparation. Neither the particular fluorine-containing compounds nor the manner of their preparation is included within the scope of this invention. Those skilled in the art of making and/or using fluorine-containing compounds will known how to make the particular compounds described herein. It is noted that the fluorine-containing compound should comprise at least a monomolecular layer defining the area upon the support that is meant to be the nonprinting portion thereof.

In connection with the fluorine-containing polymers that can be employed as the nonprinting portion of the plate, it is noted that said polymers have critical surface tensions as described herein even apart from the printing plate.

It will be obvious to those skilled in the art of making dry planographic printing plates that such plates should be strong enough to withstand repeated use. Equally obvious will be how to incorporate the disclosure herein into the making of such repeatedly usable plates.

DETAILS OF THE INVENTION

Figure 1:
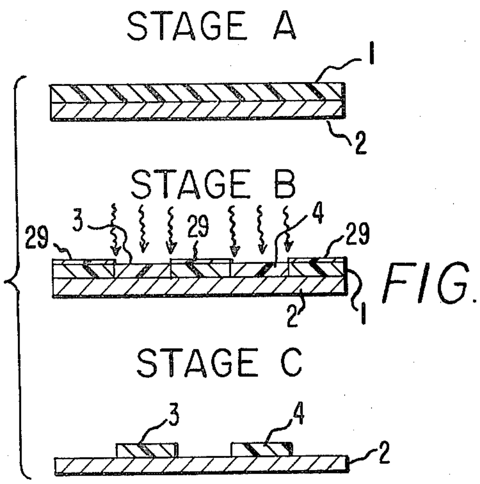
FIG. 1 is a cross-section through the layers of a dry planographic plate produced by photopolymerization of a composition selected in accordance with this invention adapted to form ink-rejecting surfaces by exposure to light.

The Critical Surface Tension of the Nonprinting Surface

It has been discovered that when solid surfaces have critical surface tensions not above 15.4 dynes/cm. as determined by advancing contact angles and not above 16.1 dynes/cm. as determined by receding contact angles, such surface will reject lithographic printing inks. The preferred critical surface tensions are up to about 10 dynes/cm. as determined by both advancing and receding contact angles.

Although it is known that highly fluorinated compounds can make paper and textile substrates resistant to penetration by oil and water, it is surprising and unexpected to discover that they can provide the resistance to pickup of printing inks under the pressure of inking rollers. The compositions described herein are known but the fact that they have critical surface tensions which render them useful in planographic printing plates was not known. In this invention the critical surface tension determined by receding contact angles is an important determinant of how readily an inking roller will withdraw ink in contact with an ink-repellent surface.

The critical surface tension for spreading defines the wettability of a solid surface by designating the highest surface tension a liquid in contact with the surface can have and still exhibit a contact angle of 0° on that solid. The critical surface tension is expressed in dynes per cm. at a particular temperature. For purposes of this invention a temperature designation of 25°C. is used.

The critical surface tension of a solid surface is determined by a sequence of operations involving (1) determining the contact angles ($\theta$) with the solid surface using a homologous series of n-alkanes as nonsolvent test liquids of known surface tension, (2) plotting the cosines of the contact angles against the surface tensions of the liquids and (3) extraplating a narrow rectilinear band of the plots to an intercept with cos $\theta = 1$. The value at that intercept is the critical surface tension of the solid surface. This value is a parameter characteristic of the solid surface only and its sharpness depends on the extent of structural similarity of the series of nonsolvent liquids used to determine it.

The method and apparatus for determining contact angles herein involves expanding or contracting, with a hypodermic syringe, a sessile drop of 0.05 to 0.1 ml. of test liquid on the solid surface being tested and observing the contact angle at the solid surface to determine advancing and receding contact angle, respectively. Additional details concerning method and apparatus are contained in Contact Angle, Wettability and Adhesion, Advances in Chemistry Series 43 on page 137 in an article by R. H. Dettre and R. E. Johnson, Jr.

The composition of the sessile drop does not change during the test. Neither does that of the surface being tested. It remains the same before, during and after testing. Critical surface tensions are normally determined on substantially smooth surfaces because undue surface roughness can affect the surface tensions. The methods described herein for the preparation of printing plates of this invention afford surfaces sufficiently smooth to enable one to obtain meaningful and reproducible values.

Nonsolvent liquids used in critical surface tension determination provide a rectilinear band which is narrower when a series of homologous liquids is used than when a series of nonhomologous liquids is used. The most frequently used homologous series and that employed herein consists of n-alkane liquids, such as n-hexane, n-heptane, n-octane, n-decane, n-undecane, n-tetradecane and n-hexadecane. The rectilinear band resulting from n-alkanes is essentially a line which gives a sharply defined critical surface tension at its intercept with cosin $\theta$ 1 and, especially for ink-rejecting surfaces of this invention, does not need to be extended very far from plots defining that line to the intercept.

Fluorine-Containing Compounds Having a Polar End and a Fluorinated Radical End Such compounds have fluorinated alkyl groups and are terminated by perfluorinated groups. In some cases the fluorinated alkyl groups can have as many as three hydrogens on terminal carbon atoms of such groups and produce a surface having the desired low critical surface tensions. Surfaces having such low critical surface tensions are believed to result from the alignment of fluorinated alkyl groups oriented away from the support and anchored to the support. This is believed to provide the support with a surface of a multitude of likewise oriented terminal portions of the fluorinated alkyl groups. Where terminal portions of such groups are $CF_3$ radicals exclusively, they tend to produce the lowest critical surface tensions. Where the terminal groups are branched and/or bear terminal hydrogen, the critical surface tensions are somewhat greater.

Surfaces having the desired low critical surface tensions can easily be provided by anchoring oleophobic and hydrophobic fluorinated compounds having fluorinated alkyl radicals to a support. The anchorage can be by polar groups, believed to have affinity for a polar support based on dipole-dipole interactions, i.e., the fluorinated composition has a fluorinated radical at one end and a polar radical at the other end and the polar radical has an affinity for the support. For example, the hydrogen of the free acid form of an acidic polar group can bond to an acceptor site on the support. Many metals, aluminum for example, have oxide layers which strongly adsorb compounds of this type.

Compounds which can be anchored to the substrate by affinity as described above, are selected from compounds having the general formula $(R(CH_2)_y)_nZ$, wherein *R* is a fluorinated alkyl radical of about 4 to 14 carbons, *y* is zero to 12, *n* is 1 or 2 according to the valence of Z and Z is a substrate-substantive radical. The radical Z is exemplified by —COOH, $—OCO(CH_2)_2COOH$, $—O—CO(CH_2)_3COOH$, $—SO_3H$, $—PO_2H$, $—P(OH)_2$, $—OP(O)(OH)_2$, $—NH_2$, —NH alkyl and $—N(alkyl)_2$ and salts and Werner complexes of these compounds when *n* is 1; and when *n* is 2, by $O_2P(O)OH$, and salts or Werner complexes of this compound. By "alkyl" is meant from one to four carbon alkyl.

Preferred compounds where Z is $—P(O)(OH)_2$ are $F(CF_2)_d(CH_2)_eP(O)(OH)_2$ wherein *d* is 4 to 14 and *e* is zero to 12. Most preferred among these are $F(CF_2)_8(CH_2)_{12}—P(O)(OH)_2$, $F(CF_2)_8(CH_2)_2P(O)(OH)_2$ and their amine salts.

Mono((fluoroalkyl)alkyl) acid phosphates and bis((fluoroalkyl)alkyl) acid phosphates are preferred alkyl acid phosphates. Most preferred compounds of this variety are those having the formula $[F(CF_2)_f(CH_2)_gO]_m P(O)(OH)_{3-m}$ where *f* is 6, 8, 10 or 12, where *g* is 1 to 12, especially where *g* is 2, and *m* is 1 to 2 or mixtures of such compounds, as well as their amine salts. Especially preferred are the mixed mono and diesters of phosphoric acid.

In addition, anchorage can be by coordination of a polar group with the support material. For example, the interaction can be between a carboxyl group and an amino group or between a metallic species and a coordinating ligand. The low critical surface tensions of the inherently ink-repellent materials used in this invention are believed to be produced by the termini of the fluorinated alkyl radicals which are oriented into alignment.

The bonding or coordinating site can be linked to a polymeric backbone. Examples are copolymers of ethylene and acrylic acid and copolymers of alkyl acrylates and dialkylaminoalkyl acrylates. The polar groups can be incorporated in a fluorinated polymer, as in a copolymer of a fluoroalkyl acrylate and acrylic acid. In addition, Werner complexes of fluorinated organic compounds are useful in preparing surfaces of the desired low critical surface tensions.

Another class of compounds which can be anchored to a support comprises silicon derivatives of the general formula $$R_fY_mR'Si\genfrac{}{}{0pt}{}{\diagup T}{\diagdown X_2}$$

in which $R_f$ is a perfluoroalakyl radical of 4 to 14 carbons, R' is a divalent hydrocarbon radical, Y is a divalent aliphatic radical containing a functional linkage selected from the group consisting of ester, ether, amine and amide linkages, *m* is zero or 1, there being not over 12 atoms in Y and R', exclusive of hydrogen, X is a readily hydrolyzable group such as halogen or a $C_1 - C_4$ alkoxy and T can be methyl or X.

These compounds are anchored by coating them on a support surface and then subjecting them to the action of water vapor whereby they produce a surface having the desired low critical surface tensions. They are believed to be converted to siliconic acids having the radical $$—R'—\underset{\substack{|\\T_{3-n}}}{Si}—(OH)_n$$

where *n* is 2 or 3 depending on the nature of T, in at least an intermediate conversion stage, providing anchorage by their siloxy groups, or, they are believed to be converted to a polymer having pendent fluorinated alkyl groups linked to a siloxy polymer backbone.

Also included are the hydrolysis products of compounds having the formula $$R^1{}_fO(C_3F_6O)_n—CF(CF_3)CONHR^2Si(OR^3)_3$$

wherein $R^1{}_f$ is perfluoroalkyl of 3 to 6 carbons, *n* is zero to 8, $R^2$ is alkylene of 1 to 12 carbons and $R^3$ is alkyl of 1 to 3 carbons. Such compounds can be made by reacting compounds of the structure $R_fO(CF(CF_3)CF_2O)_n—CF(CF_3)COF$, with appropriate aminopropyltrialkoxy silanes. Preferred compounds of this class have the formula $$CF_3CF_2CF_2O\left(\overset{\substack{CF_3\\|}}{C}FCF_2O\right)_{0\text{ to }2}\overset{\substack{CF_3\\|}}{C}FCONH(CH_2)_3Si(OC_2H_5)_3.$$

These compounds are also hydrolyzable on a support with water vapor to provide an ink-repellent surface having the desired low critical surface tensions.

FLUORINE-CONTAINING POLYMERS

Figure 2:
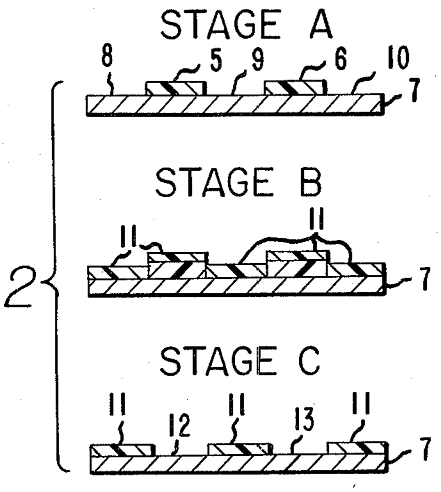
FIG. 2 is a cross-section through the layers of a printing plate of this invention, produced by overcoating a conventional lithographic plate with an oleophobic and hydrophobic compound selected according to this invention and subsequently removing the original printing area.
Figure 3:
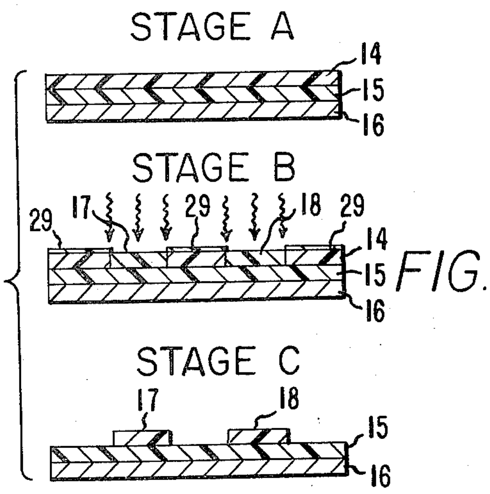
FIG. 3 is a cross-section through the layers of a printing plate of this invention having a layer of ink-receptive polymer overlaid in selected portions by a layer of ink-repellent photopolymer produced by photopolymerization.
Figure 4:
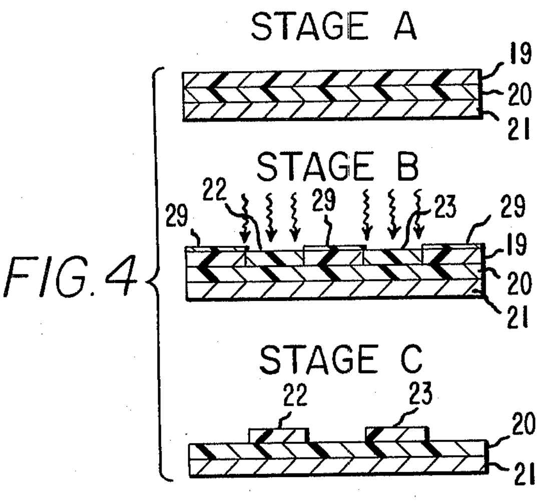
FIG. 4 is a cross-section through the layers of a printing plate of this invention having a layer of ink-repellent polymer overlaid by a layer of ink-receptive polymer produced by photohardening.
Figure 5:
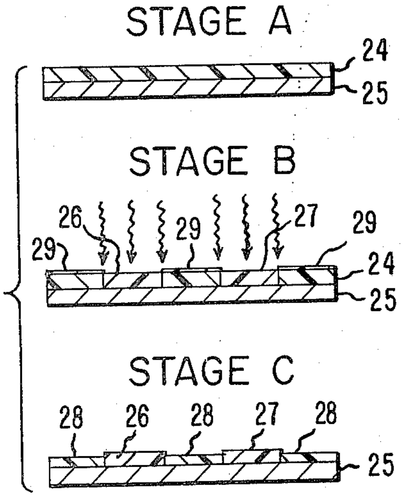
FIG. 5 is a cross-section through the layers of a printing plate of this invention bearing both printing and nonprinting areas on a common support produced through development of an exposed conventional lithographic plate.

Polymers characterized by a polymeric carbon chain with pendant fluorinated alkyl radicals can also provide an inherently ink-repellent surface on a planographic printing plate. Such polymers can be used in such plate embodiments as shown in FIG. 4, wherein they form an inherently ink-repellent background layer on which ink-receptive material is formed. Or they can be used to convert a conventional lithographic printing plate to one with an inherently ink-repellent background, as shown in FIGS. 2 and 5. Such polymers can either be used as preformed polymers or can be formed in place on the planographic plate under the influence of electromagnetic radiation projected onto selected areas of appropriate pohtopolymerizable monomers or mixtures of monomers, as shown in FIGS. 1 and 3.

Monomers useful to produce polymers having the desired low critical surface tensions have polymerizable carbon to carbon bonds, such as ethylenic bonds, linked to fluorinated alkyl radicals expected to provide pendant radicals on the polymer formed. Preferably the polymerizable radicals and fluorinated alkyl radicals are linked by heteroatoms or polar organic linking radicals. Such monomers can be characterized by a vinyl grouping of the general structure $—CR^4 = CHR^5$ in which $R^4$ is hydrogen or $CH_3$ and $R^5$ can be hydrogen, $CH_3$, COOH or a linking radical to another fluorinated alkyl group. Such vinyl groupings can be linked to fluorinated alkyl radicals through heteroatoms and organic linking radicals exemplified by the group consisting of ether, thioether, carboxylate, thiocarboxylate, amine, carboxamide and sulfonamide groupings.

Typical polymerizable compounds include esters of the formula $C_mF_{2m+1}(CH_2)_p—O—X$
$H(CF_2)_h—CH_2O—X$ and
$CH_3(CF_2)_q(CH_2)_r—O—X$ wherein $m$ is 4 to 14, $h$ is 8 to 14, $p$ is 1 to 12, $q$ is 9 to 13, $r$ is 1 to 2 and X is $—COCH = CH_2$, or, $—COC(CH_3) = CH_2$. Preferred are acrylates and methacrylates wherein $m$ is 4, 6, 8, 10, 12 or 14 and $p$ is 2, and mixtures of these esters.

Also useful are thioesters of the general formula $C_nF_{2n+1}CH_2CH_2SCOCR = CH_2$ where R is H or $CH_3$, and esters of polymerizable dicarboxylic acids, such as those of the general formula $H(CF_2)_zCH_2OCOCH = CHCOOH$ and diesters of maleic acid having the general formula

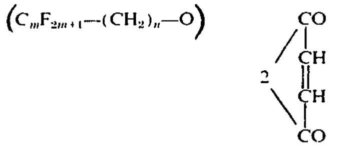

Polymerizable compounds also include ethers and thioethers such as those of the classes $CF_3(CF_2)_x—O—CH = CH_2$,
$C_nF_{2n+1}CH_2—O—CH = CH_2$, and
$C_nF_{2n+1}—S—CH = CH_2$.

Polymerizable compounds also include fluoroalkyl carboxylic acid derivatives such as vinyl esters of the structure $$C_nF_{2n+1}COOCH = CH_2,$$

as well as compounds characterized by a fluoroalkyl carboxylic acid bound by amide nitrogen, exemplified by $$CF_3(CF_2)_6CONHCH_2CH_2S\text{-}COC(CH_3) = CH_2;$$

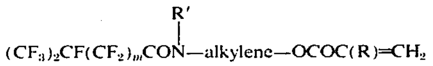

where R is H or $CH_3$ and R' is H or alkyl. Preferred is

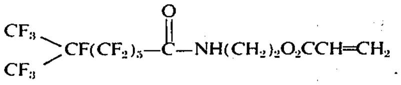

Polymerizable derivatives of fluorinated alkyl radicals bound through amine nitrogen to a polymerizable acyl radical also can be used, exemplified by $$(C_nF_{2n+1}CH_2)_2NCOCH = CH_2.$$

Polymerizable derivatives of perfluoroalkylsulfonic acids also can serve, as exemplified by $$C_nF_{2n+1}SO_2NHCH_2CH = CH_2;$$
$$C_nF_{2n+1}SO_2NHCO—CR = CH_2$$

wherein R is hydrogen or $CH_3$;

$$C_nF_{2n+1}SO_2NH—\text{alkylene}—OCH = CH_2;$$
$$C_nF_{2n+1}SO_2N(R')—\text{alkylene}—O—COCR = CH_2$$

where R is hydrogen or $CH_3$, and R' is $C_{1\text{-}6}$ alkyl. For instance, a preferred compound is $$F(CF_2)_8SO_2N(R')CH_2O_2CCH{=}CH_2$$

wherein R' is $C_{1\text{-}6}$ alkyl.

Polymerizable compounds derived from polymers of perfluoropropyleneoxide are also useful which have the formula

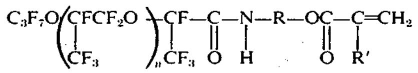

wherein $n$ is 0 to 8, preferably 0 to 2; R is $C_{2+12}$ alkylene, preferably $-(CH_2)_2-$; and R' is H or, preferably, methyl.

The above described monomers can tolerate some substitution on radicals linking the fluorinated alkyl radicals and polymerizable groups because the ends of the fluorinated alkyl radicals form a low energy surface. Other monomers, some of which are homopolymerizable to hydrophilic and/or oleophilic polymers, can be mixed with many fluorinated alkyl radical group-containing monomers to form monomer mixtures which produce copolymers useful for ink-repellent surfaces so long as the monomer proportions are those which produce copolymers of the desired low critical surface tensions. Typical, but not limiting, examples of other monomers include acrylic acid, alkyl acrylates and methacrylates in which alkyl has one to twelve carbons, N-methylolacrylamide, N-methylolmethacrylamide, 2-hydroxyethyl methacrylate, glycidyl acrylate, the vinyl ether of trifluoroethyl alcohol, cinnamic acid, diallylphosphite and the methacrylic ester of polyoxyethylated p-nonylphenol.

Another class of compounds useful to provide inherently ink-repellent surfaces on a planographic printing plate is one having pendant fluorinated alkyl groups linked to a condensation type backbone. Such a structure can be provided, for example by condensing a compound having a fluorinated alkyl radical linked to a carbon atom of a glycol with a diisocyanate compound.

Selected compositions are known to have the following values (±5%) of critical surface tension based on advancing contact angles. Except where noted, the values are determined according to the cited method of Dettre and Johnson using n-alkane test liquids for plots. Values for these compositions — based on receding contact angles — are expected to be higher but by no more than about 2 dynes per cm.

| Polymer of | Critical Surface Tension, Dynes/cm. at 25°C. |
|---|---|
| $CF_3(CF_2)_3CH_2CH_2OCOC(CH_3)=CH_2$ | 10.9 |
| $CF_3(CF_2)_5CH_2CH_2OCOC(CH_3)=CH_2$ | 7.1 |
| $CF_3(CF_2)_7CH_2CH_2OCOC(CH_3)=CH_2$ | 5.0 |
| $CF_3(CF_2)_9CH_2CH_2OCOC(CH_3)=CH_2$ | 3.6 |
| Mixture of above monomers | 6.3 |
| 95 wt. parts mixture of above monomers + 5 wt. parts $CF_3Ch_2OCH=CH_2$ | 5.0 |
| $C_7F_{15}CH_2OCOC(CH_3)=CH_2$ | 10.6* |
| $C_8F_{17}SO_2N(C_3H_7)-CH_2CH_2OCOCH=CH_2$ | 11.4* |

*M. K. Bernett and W. A. Zisman, J. Phys. Chem. 66, 1208 (1962); determined with a series of n-alkane liquids and a series of silicone liquids as test liquids.

| Compound Having Fluorinated Radical at One End and Polar Radical at Other End | Critical Surface Tension on Smooth Substrate Dynes/cm. at 25°C. |
|---|---|
| 1 mole $CF_3(CF_2)_7CH_2CH_2OP(O)(OH)_2$ +1 mole $(CF_3(CF_2)_7CH_2CH_2O)_2P(O)OH$ | 7 |
| $CF_3(CF_2)_{10}COOH$ | ~5.3 to 5.5 |
| $CF_3(CF_2)_6COOH$ | ~7.5 to 7.7 |
| $CF_3(CF_2)_2COOH$ | ~9.3 to 9.5 |

DETAILED DESCRIPTION OF THE DRAWINGS

The Figures are magnified in thickness to enhance their clarity and are not necessarily to scale. Though different levels of layer thickness are shown the overall upper surfaces indicated are essentially in a single plane, since upper layers having thicknesses of 0.0025 cm. or less are involved.

FIG. 1 shows, in Stage A, a layer 1 of a polymerizable fluorinated unsaturated monomer over support 2. Support 2 has an ink-receptive upper surface. Support 2 can be a metal or other material providing the necessary support and the necessary surface properties. In Stage B the structure is exposed to electromagnetic radiation through a stencil (or transparency) 29. During exposure, light which passes through the cut-out areas of the stencil 29 into representative zones 3 and 4 causes monomer in these zones to form polymer having the required low critical surface tensions. In some cases since monomer will come off easily during plate usage Stage B is a planographic plate essentially ready to use.

Preferably, the structure of Stage B is developed to form the structure of Stage C in which representative zones 3 and 4 provide areas of low critical surface tensions surrounded by areas of the support which are ink-receptive. Development to Stage C involves removing unexposed monomer of layer 1 in Stage B, such as by heating the support to distill off monomer, by dipping the support in a solvent for the monomer or by washing the support, optionally with the help of gentle scrubbing.

FIG. 2 shows, in Stage A, a section through a conventional lithographic plate bearing representative ink-receptive surface areas 5 and 6 on support 7 and having surface areas 8, 9 and 10 normally ink-receptive, when dry, and therefore in conventional usage wetted by a fountain liquid to make them ink-rejecting. As is recognized in the art, foutain liquids are spread over the surface of a lithographic plate and they selectively wet the nonprinting portions of the plate while not wetting ink-receptive or printing portions.

When the structure of Stage A is overlaid or painted with a fluorinated organic compound in liquid form, e.g., as a solution of said compound, and allowed to harden by drying, a structure shown as Stage B, with ink-repelling layer 11 is formed. The Stage B structure is developed with a solvent which dissolves or loosens the ink-receptive layer, areas 5 and 6, but does not dissolve the fluorinated compound overlay, and when the solvent treated structure is gently scrubbed the overlay it supports is removed and the structure of Stage C is formed. The Stage C structure then comprises ink-repellent areas 11 on support 7 having ink-receptive areas 12 and 13.

FIG. 3 shows, in Stage A, a section through a lithographic plate having a layer 14 of a polymerizable fluorinated unsaturated monomer laid over layer 15 of ink-receptive material supported on support 16. Stage B of FIG. 3 shows the same structure exposed to photopolymerizing light through stencil 29. In zones 17 and 18, monomer of layer 14 is polymerized by light projected through light transmitting areas of the stencil to form areas having the required low critical surface tensions. Development of Stage B to Stage C involves removing unexposed monomer of layer 14 by methods described under discussion of FIG. 1, to form a positive-working plate.

FIG. 4 shows in Stage A a section through a lithographic plate having a layer 19 of a composition photohardenable to ink-receptive surfaces laid over layer 20 of ink-rejecting solid fluorinated compound of this invention supported on support 21. Stage B of FIG. 4 is shown exposing this same structure to a pattern of photohardening light, through stencil 29 to form zones 22 and 23. Development of Stage B to Stage C involves preferentially removing unexposed material of layer 19, as by solvent washout, to form a negative-working plate.

Materials photohardenable to ink-receptive surfaces in this embodiment are well known in the art.

FIG. 5 shows, in Stage A, a section through a conventional sensitized lithographic plate bearing a layer 24 of material photohardenable to form an ink-receptive surface supported on support 25.

Stage B illustrates patternwise photohardening or photoconversion of the layer at zones 26 and 27. The result is a photoexposed but undeveloped plate having oleo-ink receptive areas of photoconverted photosensitive composition and areas of unconverted photosensitive composition. Development of the Stage B structure is carried out with a developing solution using a vaporizable solvent having little or no solvent or swelling action on photohardened material in zones 26 and 27 and containing in solution a fluorinated compound having the required low critical surface tensions. Such a developing solution removes unconverted material 24 and leaves a residual coating of fluorinated compound on the underlying surface of support 25. On drying the residual coating, layer 28 of the fluorinated compound is deposited as an inherently ink-repellent surface of the plate, resulting in the structure shown as Stage C. The selection of developer solvent system avoids coating the photohardened material of zones 26 and 27.

THE PRINTING PLATE ITSELF

As is apparent from the discussion presented herein and from the drawings, several configurations of the printing plate are possible vis-a-vis the support and the printing and nonprinting portions thereof. For instance, the printing portion can be the support or it can be an overlay on the support. The nonprinting portion can be an overlay on at least a part of the printing portion. The printing portion can be an overlay on at least a part of the nonprinting portion. Of course, both the printing and the nonprinting portions can be overlays on the surface of the support.

The drawings describe general methods of producing planographic printing plates of this invention. The methods include those in which printing or nonprinting plate surfaces are formed last, through conversion by electromagnetic irradiation and those in which nonprinting plate surfaces are coated last, with fluorinated alkyl compounds which provide the low critical surface tensions of this invention.

Where the nonprinting plate surfaces are formed last by electromagnetic irradiation, they can be formed by photopolymerization of one of the monomers described or a mixture of monomers which produce a solid polymer of the desired low critical surface tensions. The monomers can be coated on a substrate capable of providing an ink-receptive surface. Monomers can be applied as such or in solution or dispersion. Normally, the monomers are applied admixed with photopolymerization initiators, well-known in the art. Techniques of applying monomers include whirl-coating, spray and roll-coating methods. The thickness of the dry monomer coating is not critical but will usually range from about 0.0001 to about 0.0025 cm.

A preferred printing plate of this invention is one wherein at least one of the printing or nonprinting surfaces is a product of photopolymerization. The product can be a homopolymer or copolymer. Specifically contemplated herein is a printing plate wherein the nonprinting portion thereof is a fluorine-containing photopolymerization homopolymer or copolymer.

The choice of typical irradiation sources to form the planographic plates of this invention, by photopolymerization, is determined by the response of the initiator used. The initiators exemplified are responsive to radiation in the 2500 to 4000 A range. Radiation sources include fluorescent lamps, mercury arc lamps, carbon arc lamps and pulsed Xenon lamps.

The coated plate is covered with a transparency or stencil having a pattern of transparent areas. Ultraviolet light, the preferred radiation, is projected through the pattern for enough time to polymerize exposed areas. Most photopolymerization initiators used can activate polymerization with light of the 2500 to 4000 A spectral range. The transparency is then removed.

In cases where monomers have been photopolymerized, the unpolymerized material can often be removed by direct use of the planographic plate. However, it is usually preferred to remove unpolymerized monomer from the substrate by methods known in the art, such as treatment with a solvent for the monomer or with a detergent solution, either of these in optional combination with gentle scrubbing of the plate. Where the supporting substrate is sufficiently heat resistant, the monomer can be removed by distillation, perhaps in a vacuum chamber.

Where printing surfaces of the plate are last formed by electromagnetic irradiation, they can be produced by known methods over a substrate of solid polymer having the desired low critical surface tensions.

Where the nonprinting plate surfaces are last coated with fluorinated alkyl compounds providing low critical surface tensions, sensitized plates and developed plates known in conventional lithography can be used as starting materials to produce planographic plates of this invention.

Where sensitized lithographic plates have been photoexposed to form ink-receptive surfaces their development according to the art can be replaced by development with a solution of an appropriate substrate-substantive fluorinated alkyl compound in a solvent that does not dissolve the ink-receptive areas of the plate. Withdrawal of the plate from developer solution leaves a coating of the fluorinated alkyl compound on the background areas of the plate, providing ink repellency there, while failing to change the nature of the ink-receptive areas.

In some cases one or more components of a monomer mixture, or the monomer itself if a homopolymer is being formed, are sufficiently volatile so that the storage life of the unimaged plate is undesirably short. The storage life can be improved by giving the monomer or monomer mixture, a very thin overcoat of a different preformed polymer having solubility characteristics such that, after polymerization of the monomer, it can easily be removed by rinsing in a solvent which dissolves the coating polymer but does not dissolve the polymer forming either the printing area or the nonprinting area. Aqueous solutions are preferred for this purpose. Alternatively, the coating polymer can be incorporated in the monomer or monomer mixture.

Photopolymerization initiators used in producing ink-repellent polymers in the present invention can range in a weight part ratio of initiator to monomer of 1/99 to 50/50, preferably ranging from 3/97 to 10/90. A wide selection of initiators can be used. Aromatic ketones are especially effective. The following are typical: benzoin; desoxybenzoin; benzoin methyl ether, the trimethylsilyl ether of benzoin; Michler's ketone; ethyl Michler's ketone; benzophenone; 4,4'-dimethylbenzophenone; 4-methoxybenzophenone; 4-chlorobenzophenone; 3-trifluoromethylbenzophenone; 4-trifluoromethylbenzophenone; 4-perfluoroisopropylbenzophenone; 4-trifluoromethoxybenzophenone; and 4-trifluoromethyl-4'-methoxybenzophenone. Among these a preferred compound is benzoin methyl ether.

Also useful, as polymerization initiators are 2,2'-4,4',5,5'-hexaarylbiimidazoles in which the aryl groups are the same or different, carbocyclic or heterocyclic, unsubstituted or substituted with substituents that do not interfere with the dissociation of the biimidazole to a 2,4,5-triarylimidazolyl radical. Preferred initiators of this class are 2,2'-bis(o-chlorophenyl)-4,4',5,5'-tetrakis(m-methoxyphenyl)biimidazole and 2,2'-bis(o-chlorophenyl)-4,4',5,5'-tetraphenylbiimidazole. They can be used alone or in mixture with an aromatic ketone, such as Michler's ketone.

One method to convert an existing lithographic plate to a planographic printing plate of this invention is to coat a lithographic plate completely with a layer of an ink-rejective polymer of this invention or of a compound capable of conversion to an inherently ink-repellent surface. It is preferred to apply these compounds as solutions so as to deposit a dry layer at least 0.0001 cm., preferably 0.0005 to 0.0015 cm., thick. The plate is then treated with a solvent for the ink-receptive portion of the initial lithographic plate which solvent is a nonsolvent for the fluorinated alkyl compound coating. Typical solvents for the ink-receptive portion are methylene chloride, ethylene glycol monoethyl ether and mixtures of these.

The solvent extracts the ink-receptive layer, causing the overlying coating of fluorinated alkyl compound to break out for lack of support. The supporting substrate for the overlying coating then becomes the ink-receptive surface in areas where formerly it supported the original ink-receptive substrate.

Support material for these planographic plates can be any sturdy material which accepts by itself or which, when coated with an appropriate composition, accepts ink during printing plate use with the proviso that the fluorinated compounds will adhere to said support or coated support. In general the material may be glassy, metallic or plastic. Particular support materials are exemplified below. Critical surface tensions based on advancing contact angles are cited for some materials.

| | Critical Surface Tension, Dynes/Cm. 20°C. |
|---|---|
| Nylon 66 | 46 |
| Poly(vinyl alcohol) | 37 |
| Poly(vinyl chloride) | 39 |
| Polystyrene | 33 |
| Polyethylene | 31 |
| Cellulose acetate | |
| Poly(ethyleneterephthalate) | 43 |
| "Lucite" polyacrylic base | 39 |
| Acrylonitrile-butadiene-styrene base | |
| Aluminum | ≥ 40 |
| Stainless steel | |
| Lead | |
| Copper | |
| Zinc | |

Solid metals, having much higher surface energies than any organic compound cited above, have higher critical surface tensions than any of those organic compounds. All of the above materials have critical surface tensions at 20°C., based on advancing contact angles, of at least 30 dynes/cm. Preferred support materials have a critical surface tension, based on advancing contact angles, of at least 40 dynes/cm. and preferably are aluminum or nylon.

To print with the plates as described herein: an inking surface is contacted with the whole plate surface and the pattern of ink received is transferred to a surface to be printed as in direct contact printing or indirectly as in offset printing. No temporary wetting step to provide background ink-repellency is needed.

Because the use of fountain solution is avoided, practically any lithographic ink which will not wet the ink-repellent surfaces of this invention can be used, including oil base, glycol base, polyglycol base, formamide base and aqueous base inks. The plates of this invention allow greater latitude in the selection of inks than prior art plates allow.

The fluorine-containing surfaces taught herein have critical surface tensions lower than the ink-rejecting silicone rubber surface disclosed in U.S. Pat. No. 3,511,178, and they reject printing inks more effectively than such silicone rubber surfaces.

EXAMPLES

The following Examples are intended to illustrate and not to limit the invention. Unless otherwise indicated, all quantities are by weight.

EXAMPLE 1

Ink-Repellent Surface on Metal by Photopolymerization

Separate clean copper and aluminum (both brushed and smooth) plates were spray coated with a 10% solution of a mixture of 95 parts fluorinated alkyl acrylates of the formula $CF_3(CF_2)_nCH_2CH_2OCOCH = CH_2$ and 5 parts benzoin methyl ether in 1,1,2-trichloro-1,2,2-trifluoroethane so as to deposit a dried layer approximately 0.0025 cm. thick. The acrylates consisted of homologs having the following distribution:

| n | % homolog by weight |
|---|---|
| 5 | 37 |
| 7 | 32 |
| 9 | 19 |
| 11 and higher (predominantly n=11) | 12 |

The coated plates were allowed to dry. Light from a G. E. Blacklite fluorescent tube 5 inches away was projected onto each plate through a stencil covering one portion and a transparency covering another portion for 1 minute.

The plates were then heated to 150° to 175°C. until monomers ceased to vaporize. Images of the light-exposed plate portions remained. Printing ink coated the plate on the unexposed portion only and was repelled by the pattern of light-exposed areas.

EXAMPLE 2

Ink-Receptive Surface Generation on Ink-Repellent Background

An aluminum plate was coated with a solution of a copolymer of 85% mixed fluorinated alkyl methacrylates of the formula $CF_3(CF_2)_nCH_2CH_2OCOC(CH_3) = CH_2$ having the distribution of *n* as follows:

| n | % homolog by weight |
|---|---|
| 5 | 37 |
| 7 | 32 |
| 9 | 19 |
| 11 and higher | 12 (predominantly n = 11), |

10% methyl methacrylate and 5% glycidyl methacrylate in 1,1,2-trichloro-1,2,2-trifluoroethane so as to deposit a dry layer of 0.025 cm. thick and allowed to dry. An ink-repellent surface resulted.

A solution of 9.5 parts N-methylol acrylamide and 0.5 parts benzoin methyl ether in 90 parts acetone was sprayed on the ink-repellent surface and allowed to dry. The spray-coated plate was exposed through a negative transparency to UV radiation from a mercury arc lamp 5 inches away for 3 minutes. The exposed plate was developed by heating it at 150° to 175°C. until distillation could no longer be detected. The photopolymerized image was oleophilic and the nonimage areas from which monomer had been removed were oleo- and hydrophobic.

EXAMPLE 3

Ink-Receptive Surface Generation on Ink-Repellent Background

A plate having properties similar to that of Example 2 was produced by the same procedure using 2-hydroxyethyl methacrylate in place of N-methylol acrylamide and trichlorotrifluoroethane in place of acetone.

EXAMPLE 4

Ink-Receptive Surface Generation on Ink-Repellent Background

A plate having properties similar to that of Example 2 was produced by the same procedure using pentaerythritol tetraacrylate in place of N-methylol acrylamide.

EXAMPLE 5

Preparation of Dry Planographic Plates

A solution of 9 parts fluorinated alkyl acrylates (as in Example 1) and 1 part benzoin methyl ether in 90 parts trichloroethylene was coated at 40° to 50°C. on grained aluminum. The coated plates were exposed to a pulsed xenon lamp through a photographic transparency in a nuArc Flip-Top Plate Maker. Exposure time was 10 minutes. The plate was heat developed as in Example 2.

EXAMPLE 6

Inking and Printing with Dry Planographic Plate

A plate was prepared as in Example 5 was inked by hand with a brayer having a neoprene roller. The ink used was Sinclair and Valentine Dry-O-Graphic Black. Ink was taken up on the plate only in those areas not covered by fluorinated polymer. The image was transferred to a cast rubber roller by rolling that roller over the inked plate. That roller was then rolled over a sheet of paper to print thereon the inked pattern it had received. The printed paper had acceptable quality of ink pattern and no scumming of its intended background areas.

EXAMPLE 7

Machine Use of Dry Planographic Plate

A plate prepared as in Example 5 was used to print on a duplicator, using Sinclair and Valentine Dry-O-Graphic Black Ink. A thousand copies were printed on the press with no detectable loss of image quality from the plate. With one pass over the inking roller the plate was ready to print without additional make-ready time. The plate was as clear and sharp on the last copy as on the first.

EXAMPLE 8

Conversion of Conventional Lithographic Plate to Dry Planographic Plate

A photopolymer printing plate was covered with a negative transparency and UV light was projected through the transparency for 60 seconds in a nuArc Flip-Top Plate Maker. The plate bore a photopolymerizable coating containing (i) at least one non-gaseous ethylenically unsaturated compound capable of forming a high polymer by free-radical initiated, chain-propagating, addition polymerization; (ii) at least one 2,4,5-triarylimidazolyl dimer consisting of two lophine radicals bound together by a single covalent bond; (iii) at least one para-aminophenyl ketone; and (iv) additionally a binder. Additional details are to be found in coassigned U.S. Pat. No. 3,549,367.

Development of the exposed plate according to conventional methods produces a printing plate bearing ink-receptive polymerized areas and exposed metal areas which are ink-repellent when water-wet and ink-receptive when dry. However, this plate was washed with a solution having the makeup:

| | | |
|---|---|---|
| $Na_3PO_4$ | | 5 grams |
| $Na_2HPO_4$ | | 1 gram |
| $(HOCH_2CH_2)_2NH$ salt of mixed homologs of $(CF_3(CF_2)_nCH_2CH_2O)_2P(O)OH$ and $CF_3(CF_2)_nCH_2CH_2OP(O)(OH)_2$ where homologs are divided as follows: | | 2.5 grams |
| n = 5 | 37% | |
| n = 7 | 32% | |
| n = 9 | 19% | |
| n = 11 and higher (predominantly n = 11 | 12% | |
| Ethylene glycol mono-n-butyl ether | | 11 ml. |
| Distilled water to 200 ml. total volume | | |

The plate was then rinsed with water for four minutes. The plate developed using the above developer bore ink-receptive polymerized areas where it had been exposed to light and ink-repellent areas over metal previously covered with light-sensitive material which had not been exposed. The developed and dried plate was inked with a roller and the pattern of ink on the plate was transferred to paper via an offset roller to produce an inked copy of satisfactory quality.

EXAMPLE 9

Ink-Receptive Surface Generation on Ink-Repellent Surface

A gained aluminum substrate was coated with fluorinated polymer of a mixture of fluorinated alkyl acrylates of the formula $CF_3(CF_2)_nCH_2CH_2OCOCH = CH_2$ in which *n* is 5 in 37% by weight of the mixture, *n* is 7 in 32%, *n* is 9 in 19%, and *n* is 11 (predominantly) and higher in 12% of the mixture weight by application as a 0.25% solution in 1,1,2-trichloro-1,2,2-trifluoroethane and subsequent drying. The dry coating was overcoated with a solution of a photopolymer as described in Example 8 using a coating knife so as to produce a dry coating thickness of 0.0023 cm.

The overcoated and dried plate was exposed to a pattern of light through a negative transparency. Ink-receptive areas were generated where the overcoating was irradiated. They were brought out by developing the exposed plate with a developer while uncovering the inherently ink-repellent fluorinated polymer underlayer. The developer was formulated as follows: 1) dodecahydrate of trisodium phosphate, 25 grams; 2) monohydrate of sodium dihydrogen phosphate, 4.4 grams; 3) 2-butoxyethanol, 70 mls.; 4) 10% aqueous solution of isooctylphenylpolyethoxyethanol, 2.0 mls.; and 5) enough water to make 1 liter. The pH was then adjusted to 11.

When the plate was inked with Dry-O-Graphic Black ink, it received ink only in the ink-receptive areas and the inked plate printed the pattern of ink-receptive areas on paper without smudge or scum from the ink-repellent areas of the plate.

EXAMPLE 10

Relation of Critical Surface Tension to Ink-Repellency

A variety of fluoropolymers were evaluated for their repellency to a 10 tack and to a 12 tack lithographic printing ink and, correspondingly, for their critical surface tensions ($\gamma c$) as determined from advancing and receding contact angles by the method of Dettre and Johnson using n-hexane, n-heptane, n-octane, n-decane, n-dodecane, n-tetradecane, and n-hexadecane as test liquids.

Surfaces of the following fluoropolymers except polytetrafluoroethylene were created on aluminum by solvent application followed by drying and heating at 150°C. for 2 minutes. Polytetrafluoroethylene-coated aluminum foil was used as the polytetrafluoroethylene-coated surface. A portion of each surface was tested for ink-rejection by rolling a brayer with a neoprene roll bearing the ink across the portion several times and then observing whether or not the portion had accepted the ink. Prior determination had been made of the critical surface tensions of these compounds.

Fluoropolymers 2–5 are within the scope of this invention; fluoropolymers 1 and 6 are not and are presented for purposes of comparison with respect to ink-repellency. The Table clearly shows the relationship between ink-repellency and low critical surface tension.

TABLE

| | Polymer | Rejection of ink of 12.0 tack | Rejection of ink of 10.0 tack | Critical Surface Tension (dynes/cm. 25°C) $\alpha_c$ adv. | Critical Surface Tension (dynes/cm. 25°C) $\alpha_c$ rec. |
|---|---|---|---|---|---|
| 1. | Polytetrafluoroethylene | no | no | 17.9 | 25 |
| 2. | of $CF_3(CF_2)_nCH_2CH_2OCOCH{=}CH_2$ 37% where n = 5; 32% where n = 7; 19% where n = 9; 12% where n = 11 or more | yes | yes | 5 | 6 or less |
| 3. | of $CF_3(CF_2)_nCH_2CH_2OCOC(CH_3){=}CH_2$ (with above distribution) | yes | yes | 5 | 6 or less |
| 4. | of $H(CF_2)_8CH_2OCOCH{=}CH_2$ | yes | yes | 11.5 | 11.8 |
| 5. | of $CH_3(CF_2)_8CH_2CH_2OCOCH{=}CH_2$ $CH_2(CF_2)_9CH_3$ | yes | yes | 15.4 | 16.1 |
| 6. | $HO—(—CH_2CH—O—)—_xH$ | yes but poor; graying of surface | no | 15.9 | 17.2 |

EXAMPLE 11

Conversion of Conventional Lithographic Plate to Dry Planographic Plate

A commercial plate having organic polymer areas which are oleo ink-receptive and bare metal areas which are oleo ink-repellent when water-wet but ole ink-receptive when dry was produced. It wsa coated with a 1% petroleum ether solution of a compound of the formula $$CF_3CF_2CF_2O—(\overset{CF_3}{\overset{|}{C}F}—CF_2O—)_2—\overset{CF_3}{\overset{|}{C}F}—\underset{\underset{O}{\|}}{C}—NH(CH_2)_3Si(OC_2H_5)_3$$

and dried.

The plate was allowed to stand at 25°C. in air of 40% humidity content for a day. Under these conditions, the coating hydrolyzed and developed affinity for the metal substrate and ink-repellency at the coating surface.

The plate was placed in an equal volume mixture of ethylene glycol monoethyl ether and methylene chloride to dissolve the underlying ink-receptive organic polymer and expose underlying metal plate. The plate was dried and inked with Sinclair and Valentine Dry-O-Graphic Red Ink. Areas where ink-receptive polymer had been were ink-receptive and other areas were ink-rejecting.

EXAMPLE 12

Dry Positive-Working Plate for Glycolic and Glyceric Inks

Plates of grained aluminum were coated by a spray-coating technique with a 10% solution of 9 parts of the monomers used in Example 1, 0.2 parts of trimethylolpropane triacrylate and one part of benzoin methyl ether in 1,1,2-trichloro-1,2,2-trifluoroethane. The dried samples were imaged by exposure through a patterned transparency in a Colight Proof Printer under reduced pressure for 2 minutes. Exposed plates were heat developed at 175°C. An ink having a composition listed below was rolled from a brayer having a neoprene roller over the whole plate. Each of the plates received the ink on the aluminum background while rejecting the ink on the surfaces provided by the fluoropolymer.

Inks were as follows: four glycol black inks (of 8, 11, 13 and 16 tack) and a water color ink having these ingredients:

| | Percent |
|---|---|
| A composition comprising 19.8 parts of glycerine, 9.95 parts of white dextrine and 0.6 part of phenol | 5.9 |
| A composition comprising 11.4 parts of water, 8 parts of gum arabic, 0.5 part of gum tragacanth and .015 part of formaldehyde | 18.8 |
| Glycerin | 40.0 |
| Ultramarine blue pigment | 16.4 |
| Alumina hydrate | 14.2 |
| Titanium dioxide | 4.7. |

EXAMPLE 13

Dry Planographic Plate by Ink-Repellent Surface Formation

A 10% solution of a mixture of 9 parts of an ester-sulfonamide compound of the formula

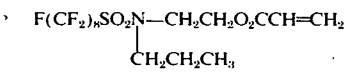

and 1 part of benzoin methyl ether in 1,1,2-trichloro-1,2,2-trifluoroethane was coated on an aluminum support so as to deposit a dried layer of the solute approximately 0.001 cm. thick. The coated plate was allowed to dry and then it was imaged through a transparency in a Colight Proof Printer for 3 minutes. It was developed by solvent washout of the monomer.

When the plate was inked with the Dry-O-Graphic Red Ink, a pattern of the opaque areas of the transparency received ink while the pattern of transparent areas of the transparency was clear of ink.

EXAMPLE 14

When the procedure of Example 13 was followed using an ester-carboxamide compound of the formula

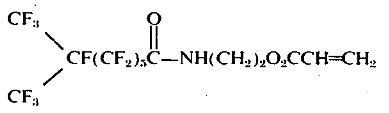

in place of the ester-sulfonamide, similar inking properties of the resulting plate were exhibited.

EXAMPLE 15

When the procedure of Example 13 was followed using a thioester compound of the formula $$CF_3(CF_2)_6CONHCH_2CH_2SCOC(CH_3) = CH_2$$

in place of the ester-sulfonamide, similar inking properties of the resulting plate were exhibited.

EXAMPLE 16

When the procedure of Example 13 was followed using each of a series of six esters of the general formula $$F(CF_2)_nCH_2CH_2O_2CC(X) = CH_2,$$

$n$ and X having the significance shown below, in place of the ester-sulfonamide similar inking properties of the resulting plate were exhibited. Individual esters tested had variations shown below.

| n | X |
|---|---|
| 6 | H |
| 6 | $CH_3$ |
| 8 | H |
| 8 | $CH_3$ |
| 10 | H |
| 10 | $CH_3$ |

EXAMPLE 17

When the procedure of Example 13 was followed using a diester of the formula $$F(CF_2)_6(CH_2)_2CH(CH_2O_2CCH = CH_2)_2,$$

prepared from $F(CF_2)_6(CH_2)_2CH(CH_2OH)_2$ and acrylyl chloride, in place of the ester-sulfonamide, similar inking properties of the resulting plate were exhibited.

EXAMPLE 18

Dry Planographic Plate with Ink-Repellent Areas of Fluorinated Alkyl Compound Copolymer An aluminum support was spray-coated with a 10% solution in methylene chloride of a mixture of 8.5 parts monomers described in Example 1, 0.5 parts trans-cinnamic acid and 1.0 part benzoin methyl ether so as to deposit a dried layer of the solute about 0.001 cm. thick. The coated plate was allowed to dry and then it was imaged through a transparency in a Colight Proof Printer for 3 minutes. The plate was then heated on a hot plate with a surface temperature of 275°C. until monomer distilled. When the resulting plates were inked with Dry-O-Graphic Black Ink a pattern of opaque areas of the transparency accepted ink while the pattern of transparent areas of the transparency rejected the ink.

EXAMPLE 19

When the procedure of Example 18 was followed using diallyl phosphite instead of cinnamic acid, the resulting plate exhibited similar inking properties.

EXAMPLE 20

Dry Planographic Plates with Ink-Receptive Surface Over Ink-Repellent Surface

An aluminum support was coated with a dry layer of a copolymer of 95 parts fluorinated alkyl acrylates described in Example 1, 5 parts vinyl ether of 2,2,2-trifluoroethanol, 0.25 parts 2-hydroxyethyl methacrylate and 0.25 parts N-methylol acrylamide. Using a coating knife, the coated support was overcoated with a coating composition of a solution of a photopolymer as described in Example 8.

The overcoated plate was imaged through a transparency and then developed in the conventional manner with a developer as described in Example 9. The resulting plate accepted ink on the pattern of the transparent areas of the transparency and repelled ink on the pattern corresponding to opaque areas of the transparency.

Whe paper was printed from this plate, using a Harris Offset Press without the fountain, acceptable printings were produced.

EXAMPLE 21

When the procedure of Example 20 was followed but a terpolymer of 85 parts fluorinated alkyl methacrylates described in Example 2, 10 parts methyl methacrylate, and 5 parts glycidyl methacrylate was substituted for the copolymer of Example 20, the resulting plate exhibited similar inking properties.

EXAMPLE 22

Ink-Repellent Surfaces

An aluminum plate was coated with a dry layer of "Tinotop" T10A, a product of Ciba-Geigy Co., believed to be a copolymer of 3 parts $F(CF_2)_{6+8}(CH_2)_2O_2CCH{=}CH_2$ and 1 part n-octyl acrylate and heated to 200°C. The resulting plate repelled lithographic printing ink applied with a roller.

EXAMPLE 23

When the procedure of Example 22 was followed but solids of fluorochemical textile treating agents sold by Minnesota Mining and Manufacturing Company and identified as "Scotchgard" FC214, FC218 and FC221 were each substituted for the copolymer of Example 22 and the plates heated to 200°C., each plate repelled lithographic printing ink as in Example 22.

EXAMPLE 24

Ink-Repellent Surface on Metal by Photopolymerization

A 10% solution of a mixture of 9 parts esteramide of the formula $$CF_3(CF_2)_2OCF(CF_3)C(=O){-}NH(CH_2)_2O_2CC(CH_3){=}CH_2$$

and 1 part benzoin methyl ether in methylene chloride was coated on an aluminum plate so as to deposit a dried layer of the ester-amide. The plate was dried and exposed through a photographic transparency to a carbon arc lamp for 2 minutes. The exposed plate was heat developed at 175°C.

The developed plate accepted printing ink on the pattern of opaque areas of the transparency used and was ink-repellent on the pattern of areas transmitting imaging light.

The embodiments of the invention in which an exclusive property or privilege is claimed are defined as follows:

1. A dry planographic printing plate comprising a support with a surface having A. a printing portion receptive to printing ink, and B. a nonprinting portion which repels printing ink, the nonprinting portion selected from the group consisting of i. a fluorine-containing compound having a fluorinated radical at one end, and a polar radical at the other end, and ii. a fluorine-containing compound that is a polymer of a compound having a fluorinated radical linked to a radical having a polymerizable carbon-to-carbon linkage, the nonprinting portion of the plate being characterized by a critical surface tension at 25°C. of up to about 15.4 dynes/cm. as determined by advancing contact angles and up to about 16.1 dynes/cm. as determined by receding contact angles, the advancing and receding contact angles determined, respectively, by observing an expanding and contracting drop of an n-alkane test liquid on the non-printing portion of the plate.

2. A printing plate according to claim 1 wherein the nonprinting portion of the surface is a fluorine-containing compound having a fluorinated radical at one end and a polar radical at the other end.

3. A printing plate according to claim 2 wherein the fluroine-containing compound is $$[F(CF_2)_f(CH_2)_gO]_mP(O)(OH)_{3+m}$$

where $f$ is 6, 8, 10 or 12, where $g$ is 1 to 12 and $m$ is 1 to 2, or mixtures thereof.

4. A printing plate according to claim 2 wherein the fluorine-containing compound is a hydrolysis product of $$CF_3CF_2CF_2O\left(\underset{CF_3}{CF}{-}CF_2O{-}\underset{CF_3}{CF}\right)_{0\text{ to }2}C(=O){-}NH(CH_2)_3Si(OC_2H_5)_3.$$

5. A printing plate according to claim 4 wherein the fluorine-containing compound has been hydrolyzed in place on the support.

6. A printing plate according to claim 1 wherein the nonprinting portion of the surface is a fluorine-containing polymer of a compound having a fluorinated radical linked to a radical having a polymerizable carbon-to-carbon linkage.

7. A printing plate according to claim 6 wherein the polymer is derived from a monomer having the formula $$CF_3(CF_2)_6CONHCH_2CH_2SCOC(CH_3) = CH_2.$$

8. A printing plate according to claim 6 wherein the polymer is derived from $$C_3F_7O(CF(CF_3)CF_2O)_nCF(CF_3)C(=O)NH(CH_2)_2O_2CC(CH_3){=}CH_2$$

wherein $n$ is 0 to 2.

9. A printing plate according to claim 6 wherein the polymer is derived from a monomer having the formula $$F(CF_2)_6CH_2CH_2CH(CH_2O_2CCH{=}CH_2)_2.$$

10. A printing plate according to claim 6 wherein the polymer is derived from $C_mF_{2m-1}(CH_2)_p{-}O{-}X$, $H(CF_2)_h{-}CH_2{-}OX$, or $CH_3(CF_2)_q(CH_2)_r{-}O{-}X$.

wherein $m$ is 4 to 14, $p$ is 1 to 12, $r$ is 1 to 2, $h$ is 8 to 14, $q$ is 9 to 13 and X is $-COCH{=}CH_2$, or, $-COC(CH_3){=}CH_2$.

11. A printing plate according to claim 6 wherein the polymer is derived from $$F(CF_2)_8SO_2N(R'){-}CH_2CH_2O_2CCH{=}CH_2$$

wherein R' is $C_{1-6}$ alkyl.

12. A printing plate according to claim 6 wherein the polymer is derived from $$(CF_3)_2CF(CF_2)_5C(=O){-}NH(CH_2)_2O_2CCH{-}CH_2.$$

13. A printing plate according to claim 1 wherein the nonprinting portion is an overlay on at least a part of the printing portion.

14. A printing plate according to claim 13 wherein the printing portion is the support.

15. A printing plate according to claim 13 wherein the printing portion is an overlay on the support.

16. A printing plate according to claim 1 wherein the printing portion is an overlay on at least a part of the nonprinting portion.

17. A printing plate according to claim 1 wherein both the printing and the nonprinting portions of the surface are overlays on the surface of the support.

18. A printing plate according to claim 1 wherein the critical surface tension is up to about 10 dynes/cm. as determined by both advancing and receding contact angles.

19. A printing plate according to claim 1 wherein the printing portion of the surface has a critical surface tension determined by advancing contact angles of at least 30 dynes/cm. at 20°C.

20. A printing plate according to claim 19 wherein the printing portion of the surface has a critical surface tension determined by advancing contact angles of at least 40 dynes/cm. at 20°C.

21. A printing plate according to claim 20 wherein the printing portion of the surface is nylon or aluminum.

22. A printing plate according to claim 21 wherein the printing portion of the surface is aluminum.

23. A printing plate according to claim 1 wherein at least one of the printing or nonprinting portions of the surface is a photopolymerization product.

24. A process for making a planographic printing plate comprising

A. treating the surface of a photoexposed but undeveloped lithographic plate having ink-receptive areas of photoconverted photosensitive composition and areas of unconverted photosensitive composition, with a liquid which
  i. is a solvent for and capable of removing the unconverted photosensitive composition,
  ii. is nonswelling and a nonsolvent for the ink-receptive photoconverted photosensitive composition, and
  iii. has dissolved therein the ink-rejecting fluorine-containing compound selected from the group consisting of
    a. a fluorine-containing compound having a fluorinated radical at one end, and a polar radical at the other end, and
    b. a fluorine-containing compound that is a polymer of a compound having a fluorinated radical linked to a radical having a polymerizable carbon-to-carbon linkage, and B. removing the liquid of (A) and with it the unconverted photosensitive composition from the surface leaving behind on the areas where the unconverted composition had been, a sufficient residue of the fluorine-containing compound to impart ink-repellency to those areas when dry.

25. A process for making a planographic printing plate comprising

A. coating the surface of a lithographic plate having inherently ink-receptive portions and portions which are ink-receptive when dry but ink-rejecting when wet by a fountain fluid, when a layer of the ink-repellent fluorine-containing compound selected from the group consisting of
  a. a fluorine-containing compound having a fluorinated radical at one end, and a polar radical at the other end, and
  b. a fluorine-containing compound that is a polymer of a compound having a fluorinated radical linked to a radical having a polymerizable carbon-to-carbon linkage, and B. treating the coated surface with a liquid which is
  i. a solvent for and capable of removing the inherently ink-receptive portion of the lithographic plate surface beneath the coating, and
  ii. a nonsolvent for the ink-repellent fluorinated composition, and C. removing the liquid of (B) from the surface and with it the inherently ink-receptive portions of the lithographic plate beneath the coating and the fluorine-containing compound coating over the inherently ink-receptive portions leaving behind uncoated portions of lithographic plate which are ink-receptive.

26. A process for making a planographic printing plate comprising

A. coating an ink-receptive surface with a coating of the photopolymerizable fluorine-containing compound selected from the group consisting of
  a. a fluorine-containing compound having a fluorinated radical at one end, and a polar radical at the other end, and
  b. a fluorine-containing compound that is a polymer of a compound having a fluorinated radical linked to a radical having a polymerizable carbon-to-carbon linkage, and B. photopolymerizing a portion of said coating thereby converting it into a polymer, and C. removing the unpolymerized fluorine-containing composition.

27. A process according to claim 26 wherein the unpolymerized fluorine-containing composition is removed by volatilizing.

28. A process for printing with a planographic printing plate according to claim 1, comprising inking the plate while it bears no fountain solution and transferring the pattern of ink received on the plate to a surface to be printed.

* * * * *

UNITED STATES PATENT OFFICE

CERTIFICATE OF CORRECTION

PATENT NO. : 3,910,187

DATED : October 7, 1975

INVENTOR(S) : Donald Philip Cords

It is certified that error appears in the above-identified patent and that said Letters Patent are hereby corrected as shown below:

In Claim 3, the subscript at the end of the formula should be -- 3-m --.

In Claim 4, the formula should be $$\text{-- } CF_3CF_2CF_2O\left(\overset{CF_3}{\overset{|}{C}}F-CF_2O\right)_{0\text{ to }2}\overset{CF_3}{\overset{|}{C}}F-\underset{O}{\underset{\|}{C}}-NH(CH_2)_3Si(OC_2H_5)_3\text{ --.}$$

In Claim 10, line 3, the formula should be -- $C_mF_{2m+1}(CH_2)_p$-O-X --.

In Claim 10, line 4, the formula should be -- $H(CF_2)_h$-$CH_2$-OX --.

In Claim 12, the last bond in the formula should be a double bond.

In Claim 25, column 24, line 6, "when" in its second occurrence should be -- with --.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*